United States Patent [19]
Chenoweth

[11] Patent Number: 5,689,631
[45] Date of Patent: Nov. 18, 1997

[54] PARALLEL PROCESSING COMPUTER AND METHOD OF SOLVING A PROBLEM USING SIMULTANEOUSLY EXECUTED DIFFERENT AND COMPETING PROCEDURES

[75] Inventor: Stephen V. Chenoweth, Dayton, Ohio

[73] Assignee: NCR Corporation, Dayton, Ohio

[21] Appl. No.: 502,942

[22] Filed: Jul. 17, 1995

Related U.S. Application Data

[63] Continuation of Ser. No. 82,705, Jun. 28, 1993, abandoned.
[51] Int. Cl.$^6$ .............................. G06F 13/00; G06F 15/16
[52] U.S. Cl. ........................ 395/182.09; 395/182.1; 395/601; 395/290; 395/553; 395/674
[58] Field of Search ........................... 395/601, 182.02, 395/182.09

[56] References Cited

U.S. PATENT DOCUMENTS

| | | | |
|---|---|---|---|
| 4,876,643 | 10/1989 | McNeill et al. | 395/290 |
| 4,992,935 | 2/1991 | Comerford et al. | 395/425 |
| 5,197,002 | 3/1993 | Spencer | 395/234 |
| 5,243,607 | 9/1993 | Masson et al. | 395/185.02 |
| 5,325,525 | 6/1994 | Shan et al. | 395/674 |
| 5,524,257 | 6/1996 | Koike et al. | 395/800 |

FOREIGN PATENT DOCUMENTS

| | | |
|---|---|---|
| 3133715 | 4/1982 | Germany . |
| 2084770 | 4/1982 | United Kingdom . |

OTHER PUBLICATIONS

Chenoweth, "An Analysis of the Asymptotic Performance of the A* Algorithm" (1990).

Chenoweth and Davis, "Heuristics with Polynomial Growth Patterns and the Asymptotic Complexity of A*", pp. 49–62 (1990).

Fennel and Lesser, "Parallelism in Artificial Intelligence, Problem Solving: A Case Study of Hearsay II", pp. 98–111 (1977).

Ferguson and Korf, "Distributed Tree Search and its Application to Alpha–Beta Pruning", pp. 128–132 (1988).

Irani and Shih, "Parallel A* and AO* Algorithms: An Optimality Criterion and Performance Evaluation", pp. 274–277 (1986).

Kumar, Ramesh and Rao, "Parallel Best–First Search of State–Space Graphs: A Summary of Results", pp. 122–127 (1988).

Kumar, Rao and Ramesh, "parallel Depth First Search on the Ring Architecture", pp. 128–132 (1988).

Lai and Sahni, "Anomalies in Parallel Branch–and–Bound Algorithms", pp. 594–602 (1984).

Rao, Kumar and Ramesh, "A Parallel Implementation of Iterative–Deepening–A*", pp. 178–182 (1987).

Saletore and Kalé, "Consistent Linear Speedups to a First Solution in Parallel State–Space Search", pp. 227–233 (1989).

Wah, "MANIP—A Multicomputer Architecture for Solving Combinatorial Extremum–Search Problems", pp. 377–390 (1984).

Acharya, "message Passing Computers as Production System Engines" (1989).

Kale and Saletore, "Parallel Search for a First Solution" (1989).

Kumar and Rao, "Superlinear Speedup in Parallel Depth–First Search" (1989).

*Primary Examiner*—Thomas G. Black
*Assistant Examiner*—Hosain T. Alam
*Attorney, Agent, or Firm*—Paul W. Martin

[57] ABSTRACT

A parallel search method for a parallel processing computer which employs different and competing search procedures to search a collection of data. A search problem is formulated by a data management application. The competing search procedures are created from the formulation of the search problem and pre-existing rules. The competing procedures are executed. Additionally, execution of the competing search procedures may be monitored to obtain information about the effectiveness of the competing procedures, and the competing procedures may be changed based upon the information. In those search cases where a time limit is necessary, a timer is started at the start of execution, and a solution is returned to the data management application.

15 Claims, 11 Drawing Sheets

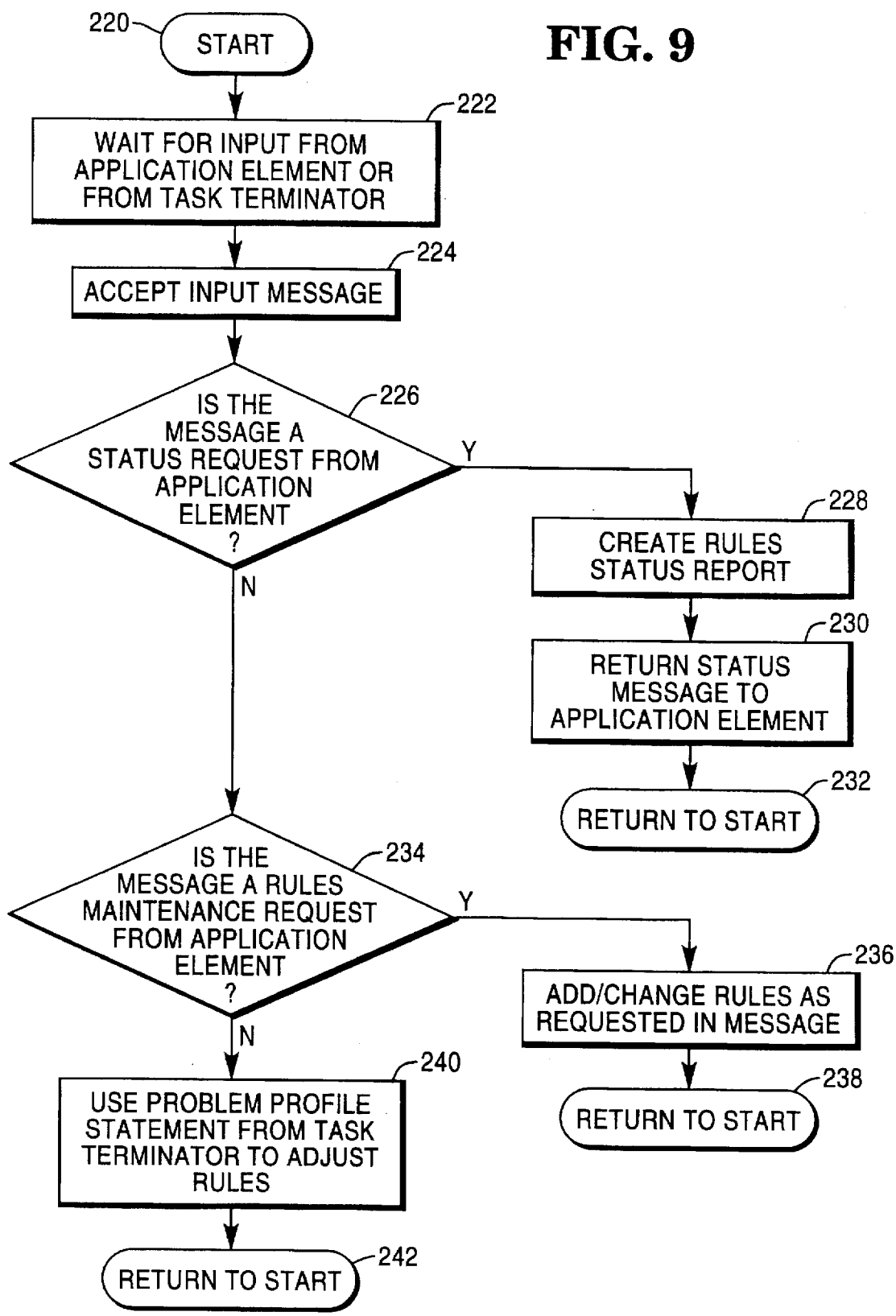

PARALLEL PROCESSING COMPUTER AND METHOD OF SOLVING A PROBLEM USING SIMULTANEOUSLY EXECUTED DIFFERENT AND COMPETING PROCEDURES

This application is a continuation of Ser. No. 08/082,705 filed on Jun. 28, 1993, and now abandoned.

BACKGROUND OF THE INVENTION

The present invention relates to parallel processing computers, and more specifically to a parallel search method.

Parallel processing offers a fast way to solve business and scientific problems. Parallel processing computers may include computers having multiple central processing units (CPUs) and computers having a single CPU and one or more coprocessors.

Use of parallel processing allows the computing load to be spread across multiple processing elements and associated resources to produce the desired result more quickly than in single processing units. The common approach to distributing the computing load is to execute the same algorithm or cooperating parts of an algorithm on different data elements, in each processor of the computer. Each resource may perform a subset of a larger algorithm.

In computationally intensive tasks, such as a search to locate data or a search to create a solution path for a complex problem, the largest source of inefficiency is in the choice of search algorithm. (The algorithm is the plan or methodology used to perform the search.) Even with parallel processing, there can be great differences in time required to complete a search, depending on the choice of the algorithm. Large differences in timing can result from subtle differences in the problem specification or in the data being searched, so that selection of the optimal algorithm prior to or even during the running of the search can be difficult or impossible.

Therefore, it would be desirable to provide a parallel search method which applies different search algorithms or varies the search algorithms to make optimal use of the computing power of a parallel processing computer.

SUMMARY OF THE INVENTION

In accordance with the teachings of the present invention, a parallel search method is provided. The parallel search method employs different and competing search procedures to search a collection of data. A search problem is formulated by a data management application. The competing search procedures are created from the formulation of the search problem and pre-existing rules. The competing procedures are executed. Additionally, execution of the competing search procedures may be monitored to obtain information about the effectiveness of the competing procedures, and the competing procedures may be changed based upon the information. In those search cases where a time limit is necessary, a timer is started at the start of execution, and the best solution under predetermined criteria, is returned to the data management application.

Under the present invention, parallel processing is performed by using parallel resources, such as computer processors, to execute alternative algorithms, or to execute variations to a given algorithm, duplicating the search task on each resource. In database search, for example, the method of the present invention would create different search plans and execute them simultaneously. In an artificial intelligence search, the method of the present invention runs the same search using different algorithms or using different heuristic weights with the same algorithms.

The present invention differs from existing parallel processing methods because different algorithms are performed by segments of the available computer resources, instead of having each resource perform a subset of a larger algorithm. The only common processing for the combined task is to initiate the competing searches, record or compare intermediate and final results as they are returned, redirect any resources if necessary, and terminate the activity on all remaining resources when a satisfactory solution has been returned or when a time limit has expired.

The present invention also differs from existing methods because the latter typically require more frequent communication among the resources. When a single search algorithm is used, and only the data is subdivided, finer and finer subdivisions usually necessitate more and more frequent communications. Thus, the existing methods are limited, for example, in the extent to which they can make practical use of computers for which the frequency of interprocessor communications could be a bottleneck.

A major advantage of the disclosed idea is the lowered communication required among computer system resources. When each resource is cooperating to solve a larger problem, as in prior uses of parallel processing computers, frequent communication may be needed to ensure that all resources are making progress toward a mutual goal. In the disclosed invention, the resources are working on competing approaches to solving the problem, and thus may operate totally independently.

It is accordingly an object of the present invention to provide a parallel search method for parallel processing computers.

It is another object of the present invention to provide a parallel search method for parallel processing computers which employs different and competing search procedures to accomplish a search task.

It is another object of the present invention to provide a method for utilizing the assets of a parallel processing computer to solve a predetermined problem by executing different and competing procedures to solve the problem.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 9 is a flow diagram illustrating the operation of the Rules Updater of the system of the present invention.

DETAILED DESCRIPTION OF THE PREFERRED EMBODIMENT

Figure 1:
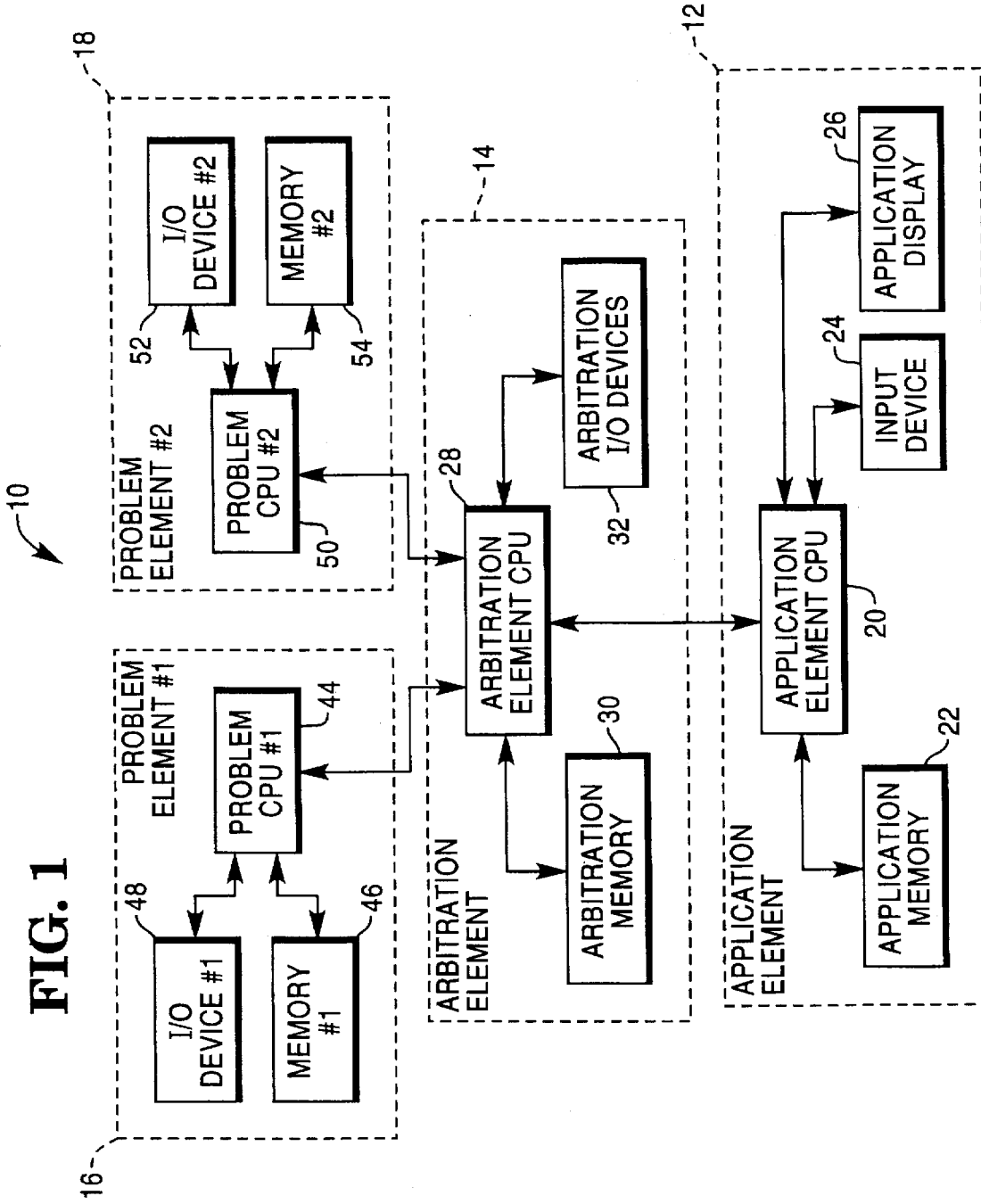
FIG. 1 is a block diagram of a parallel processing computer system.

Turning now to FIG. 1, parallel processing system 10 includes application element 12, arbitration element 14, first problem element 16, and second problem element 18.

Application element 12 executes problem statements input by a user. Application element 12 may be a personal computer or other workstation, or a large server. Application element 12 includes application element CPU 20, application memory 22, application input device 24, and application display 26. Application input device 24 may include a keyboard input device.

Arbitration element 14 controls operation of first and second problem elements 16 and 18 in accordance with instructions from application element 12. Arbitration element 14 includes arbitration element CPU 28, arbitration memory 30, and arbitration I/O devices 32. Arbitration element 14 may be an existing high-powered workstation or a node in a large parallel processing machine.

First and second problem elements 16 and 18 solve problems and return their solutions to application element 12 through arbitration element 14. First problem element 16 includes first problem CPU 44, first problem memory 46, and first problem I/O device 48. Second problem element 18 includes second problem CPU 50, second problem memory 54, and second problem I/O device 52. First and second problem elements 16 and 18 may be high powered workstations, database servers, or separate nodes in a large parallel processing machine.

First and second problem elements 16 and 18 contain sufficient CPU, memory, and I/O device capacity to be able to solve required problems independently using the algorithmic variations given to them. For example, a database might be duplicated, one copy on each of first and second problem elements 16 and 18, and each problem element might have its own copy of the database software.

Figure 2:
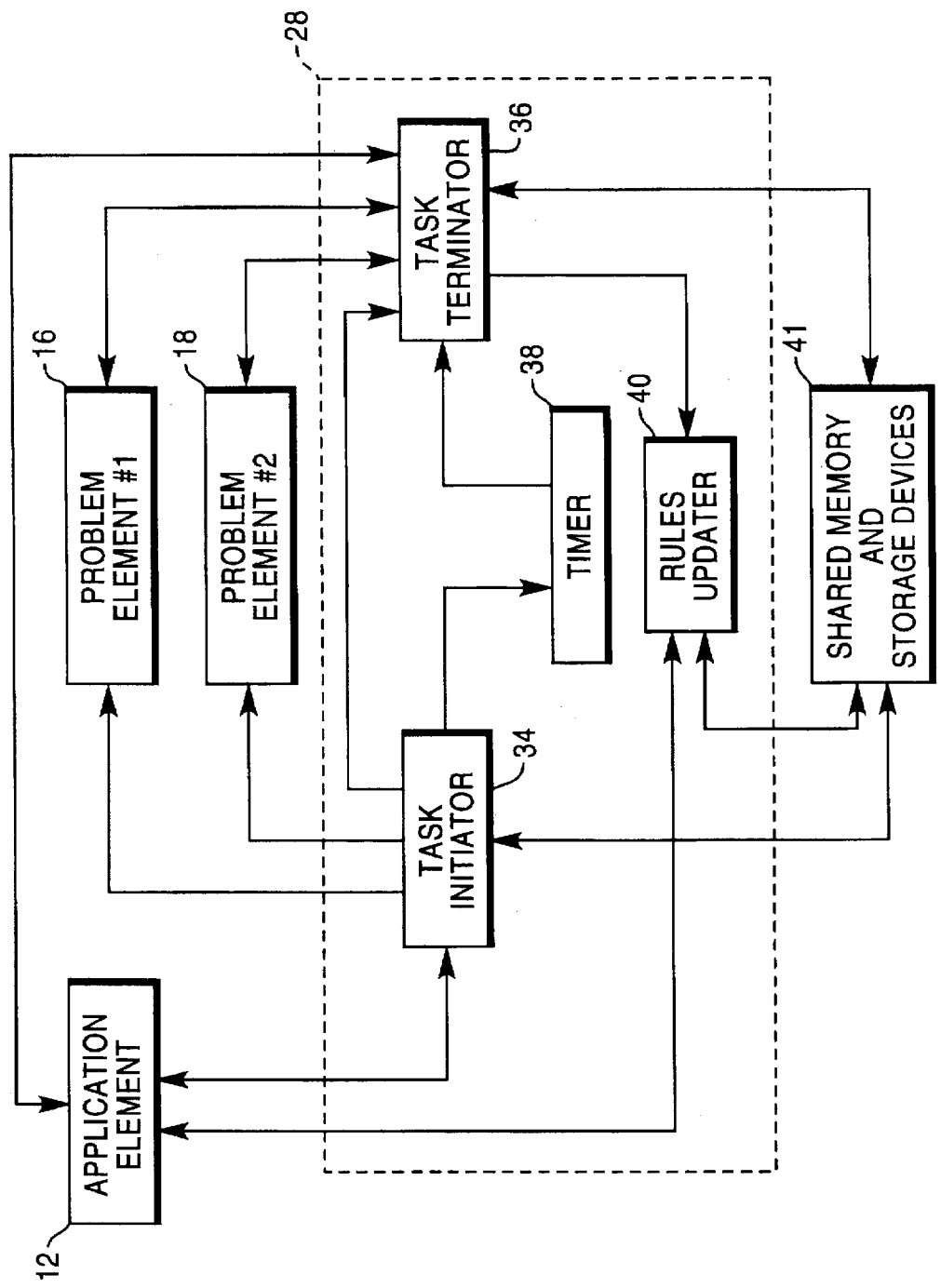
FIG. 2 is a block diagram of the arbitration element of FIG. 1.

Referring now to FIG. 2, arbitration CPU 28 further includes task initiator 34, task terminator 36, timer 38, and rules updater 40. Preferably, these components are implemented as software, but may be implemented as hardware. Task initiator 34 begins problem execution on first and second problem elements 16 and 18 and uses rules to determine the assignment of algorithmic variations to first and second problem elements 16 and 18.

Task terminator 36 accepts problem solution messages from first and second problem elements 16 and 18 and selects the preferred response to return to application element 12.

Timer 38 alerts task terminator 36, after a predetermined time interval has passed, that no response or no further response has been received from first and second problem elements 16 and 18.

Rules updater 40 sets rules in shared memory and storage devices 41, shown outside arbitration CPU 28. Shared memory and storage devices 41 include arbitration memory 30 and I/O devices 32.

Figure 3:
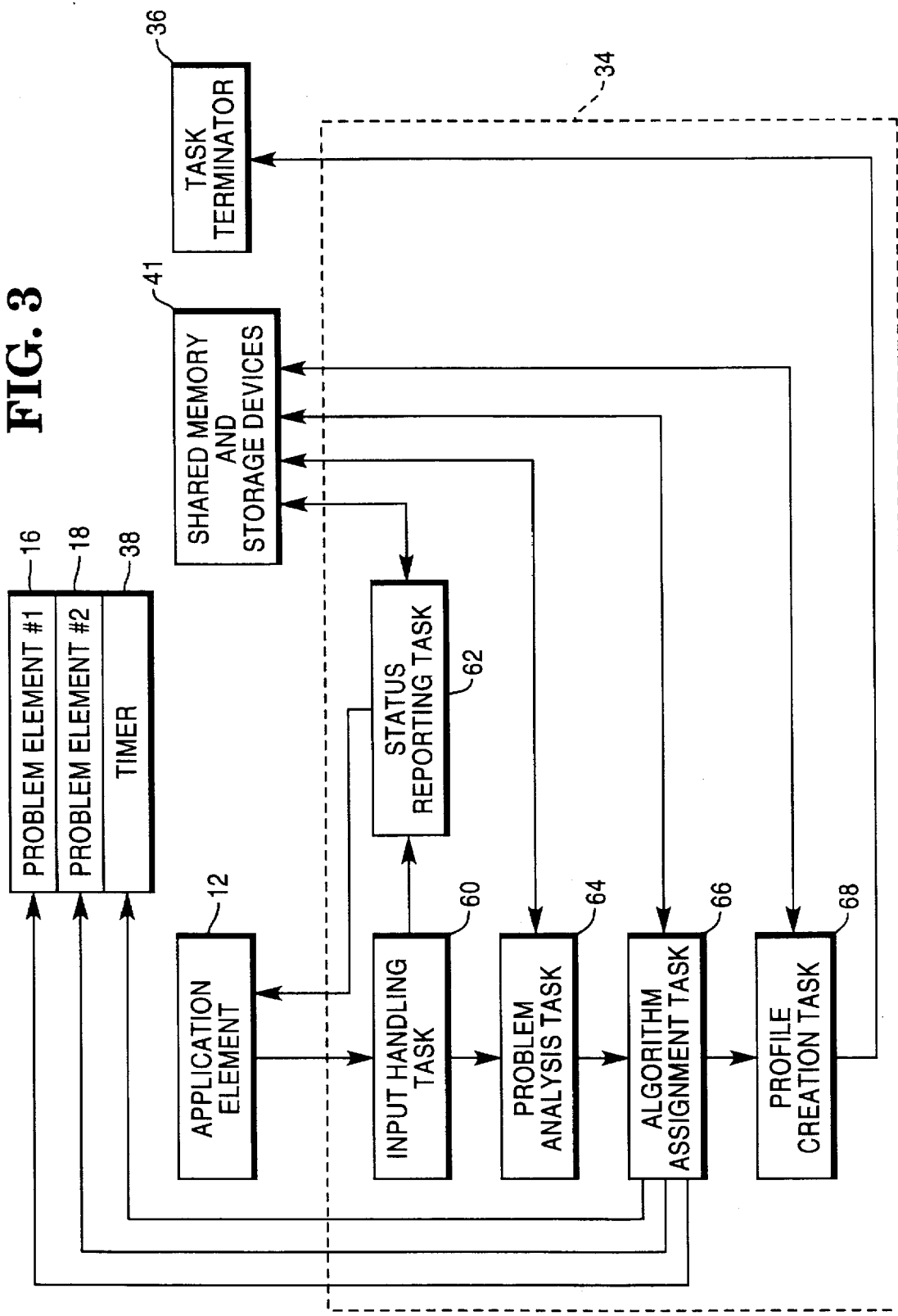
FIG. 3 is a block diagram of the task initiator of FIG. 2.

Referring now to FIG. 3, task initiator 34 includes input handling task 60, status reporting task 62, problem analysis task 64, algorithm assignment task 66, and profile creation task 68. Input handling task 60 accepts, validates, and organizes processing requests from application element 12. Input handling task 60 also routes these requests to their next destination within task initiator 34, either problem analysis task 64 or status reporting task 62.

Status reporting task 62 reports to application element 12 the status of pending problem execution tasks. It reports any detected internal errors in handling these tasks and it reports statistics characterizing that handling.

Problem analysis task 64 decides how to handle a problem from application element 12. It may apply problem-specific rules to analyze a problem.

Algorithm assignment task 66 sends the different algorithmic variations, selected by problem analysis task 64, to first and second problem elements 16 and 18.

Profile creation task 68 creates an abstract version of a given problem, including its terminating conditions, and sends it to task terminator 36.

Figure 4:
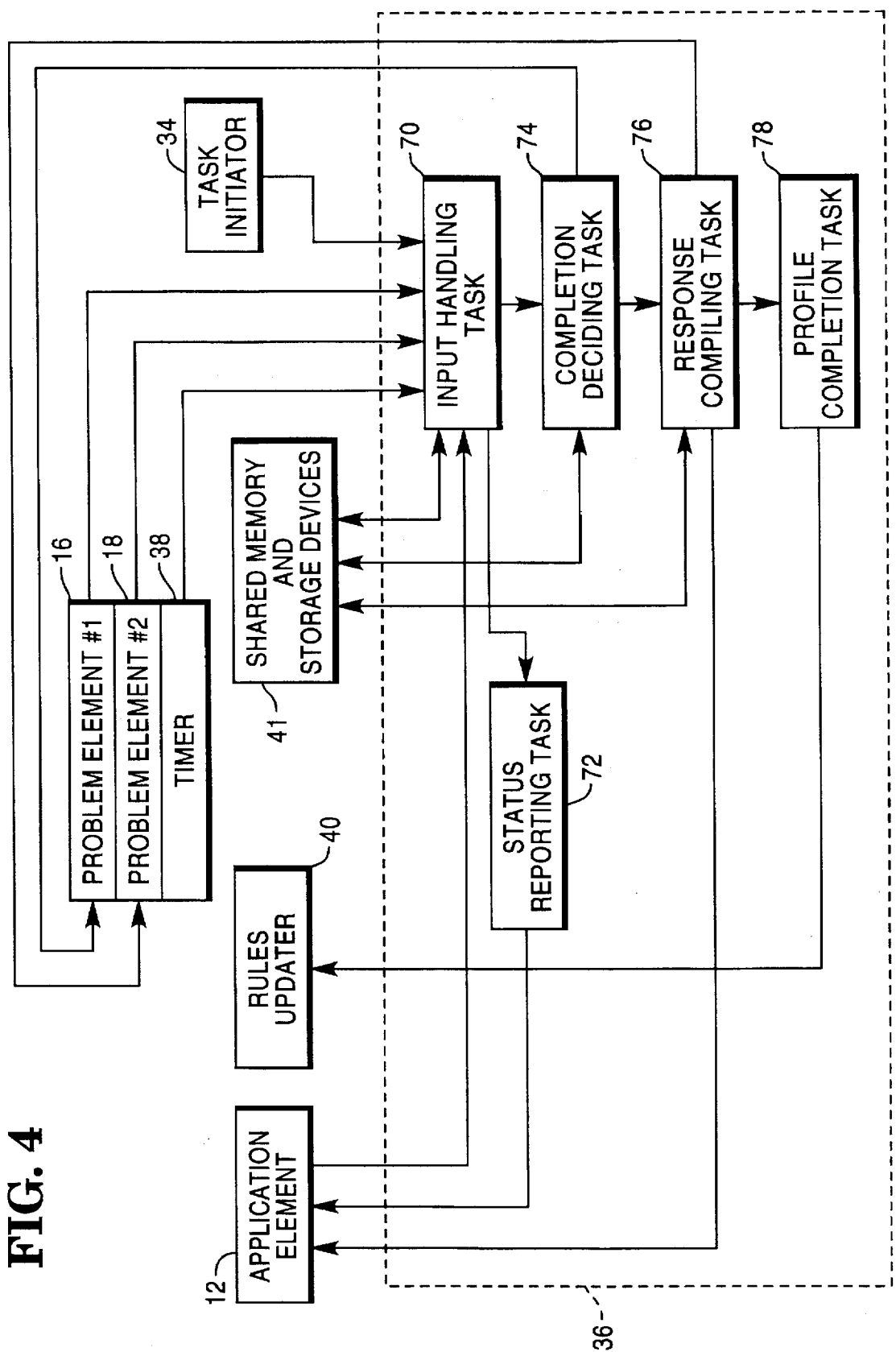
FIG. 4 is a block diagram of the task terminator of FIG. 2.

Referring now to FIG. 4, task terminator 36 includes input handling task 70, status reporting task 72, completion deciding task 74, response compiling task 76, and profile completion task 78. Input handling task 70 accepts, validates, and organizes processing completion messages from problem elements 16 and 18, as well as time interval expiration messages from timer 38. Input handling task 70 also accepts messages such as problem profiles from task initiator 34.

Task terminator's status reporting task 72 reports the completion status of ongoing problem execution tasks, any detected internal errors, and related statistics to application element 12.

Completion deciding task 74 uses either rules from shared memory and storage devices 41 or information sent by application element 12 to determine when a given problem task should be concluded.

Response compiling task 76 notifies application element 12 of task completion and the result of that completion.

Profile completion task 78 updates statistics or descriptive data about the completed task and forwards this information and the problem profile to rules updater 40.

Figure 5:
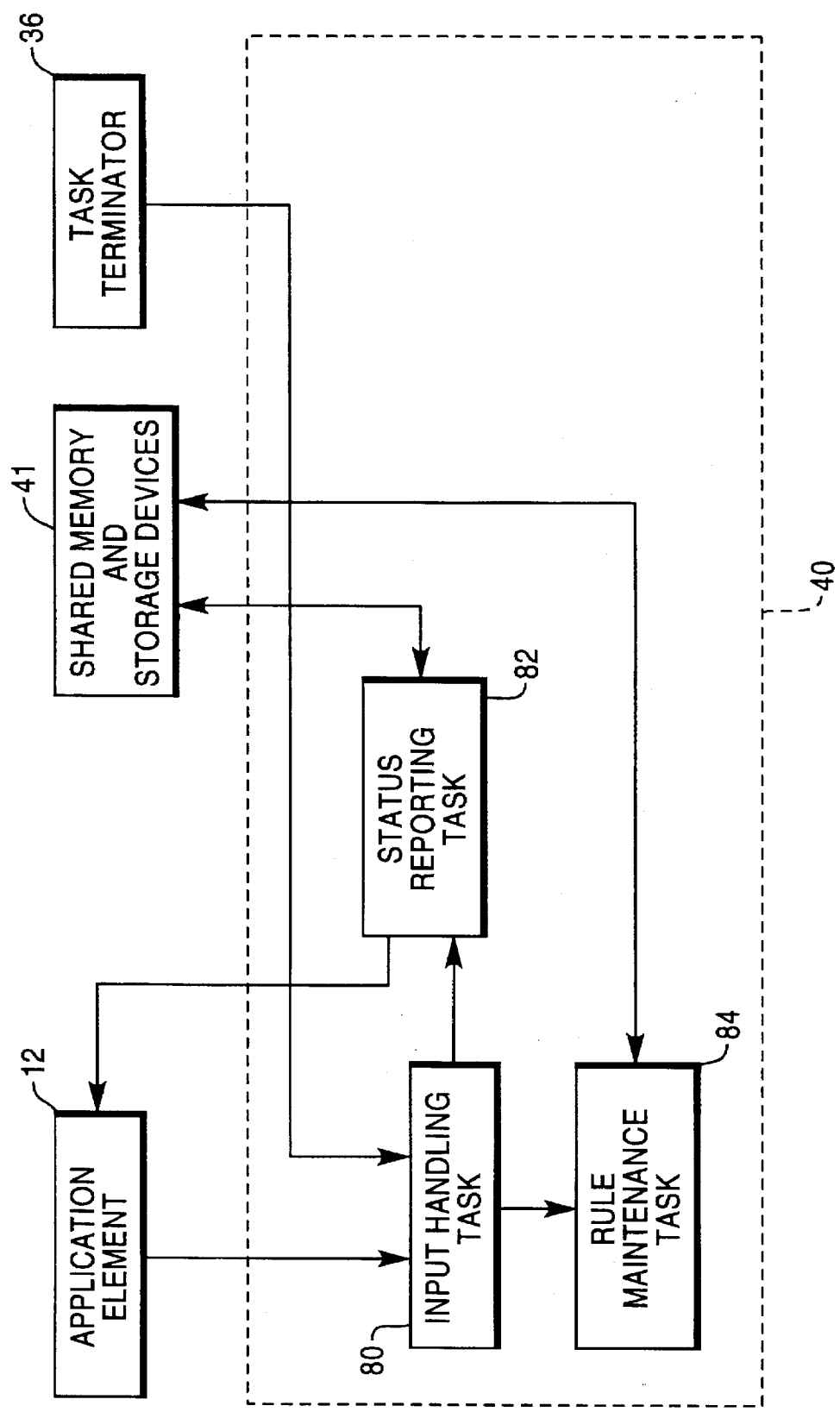
FIG. 5 is a block diagram of the Rules Updater of FIG. 2.

Turning now to FIG. 5, rules updater 40 includes input handling task 80, status reporting task 82, and rule maintenance task 84. Input handling task 80 processes messages from application element 12 and from task terminator 36, distributing these messages to rule maintenance task 84 and to status reporting task 82.

Status reporting task 82 reports the status and changes to rules stored in shared memory and storage devices 41 to application element 12.

Rule maintenance task 84 performs manual maintenance sorting rules sent by application element 12. Rule maintenance task 84 also modifies those rules via automatic maintenance sorting rules based upon task outcomes sent with problem profiles from task terminator 36.

Figure 6:
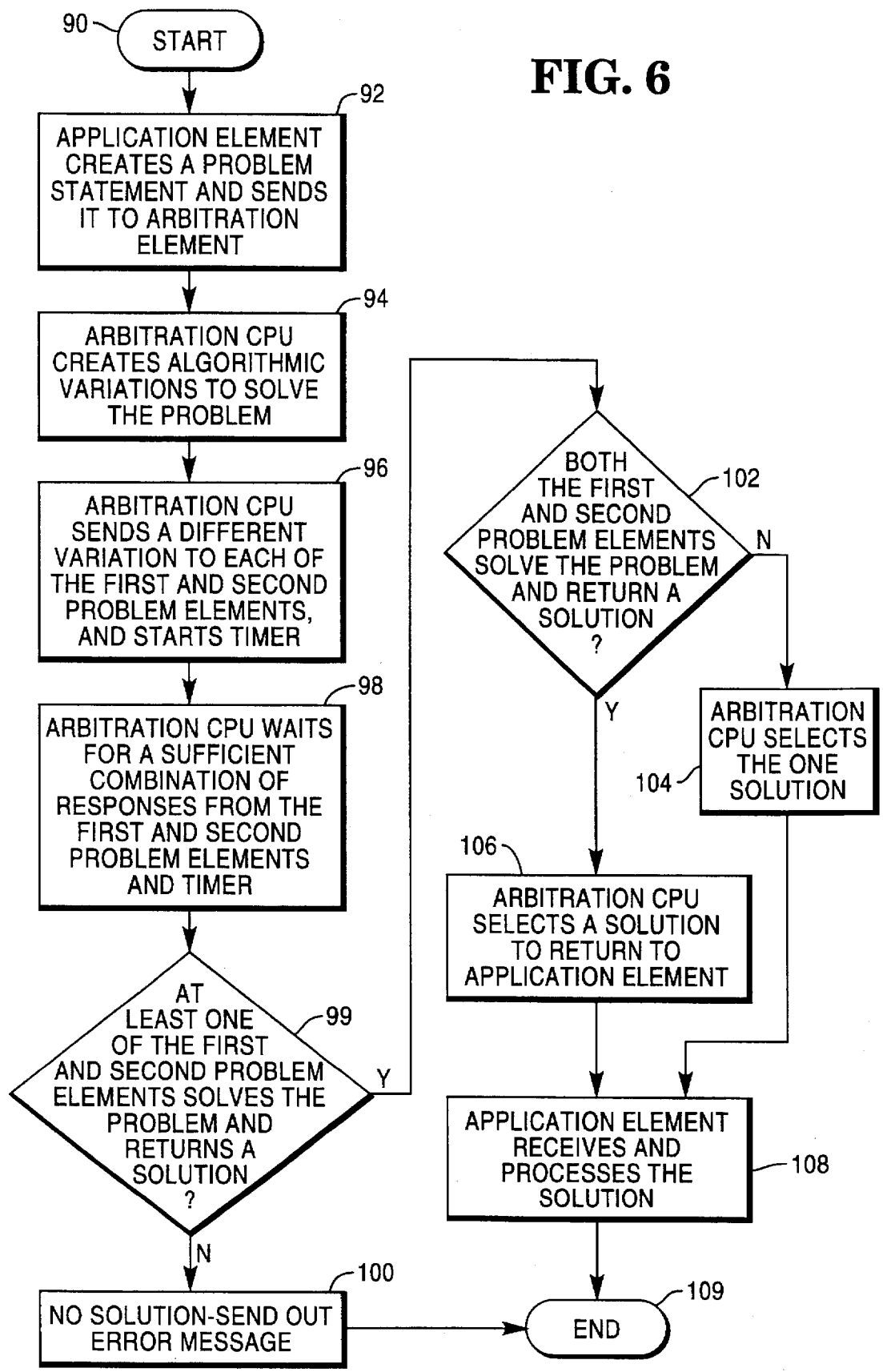
FIG. 6 is a flow diagram illustrating the operation of the system of the present invention.

Turning now to FIG. 6, the operation of system 10 under the method of the present invention is explained in detail, beginning with START 90. In block 92, application element 12 creates a problem statement and sends it to arbitration element 14. This problem statement might be a database query or a heuristic search. In a simple case, a user could type in a problem or query on the keyboard of a client machine. In a more complicated case, user input may be pre-processed using hardware and software on application element 12. An example of such pre-processing would be converting a user query into standard database terminology.

The term "search" as used in this description has a broad meaning which includes general notions of "looking for something", as well as field-specific definitions. The term may be likened most to the term "constructive search", as it is used in artificial intelligence. A constructive search is a "universal problem-solving mechanism in which the sequence of actions required for solutions are not known a priori, but must be determined by a systematic trial-anderror exploration of alternatives". All that is required to formulate a search problem is a set of states of the problem, a collection of operators that change the state, an initial state, and a description of the goal state. The task then becomes one of finding a sequence of operators that transform the initial state into a goal state.

An important difference, often present, between artificial intelligence searching and searching done in other areas of computer science concerns the explicit prior existence of the entities being searched. In database search, for example, the data being sought usually already exists. The key consideration is how best to organize this data for later accessing. With an artificial intelligence search, the "problem solution" typically is created as the search progresses, so that only rough approximations to the final, desired result can be organized prior to solution discovery.

An artificial intelligence search also differs in that the objective or goal of the search is typically expressed in very general ways, so that a wide variety of specific answers or answer patterns might end up being "the solution." That is, usually there are many possible alternative solutions. In a search which is part of a game-playing program, for example, any "winning play" could be an acceptable goal.

Under the method of the present invention, problem statements sent to arbitration element 14 may specify how to use competing resources. For example, the problem statement may say to return the first response from either problem element 16 or 18, whichever solved the problem first, or the problem statement may say to return the best response, in some prescribed fashion, found within a given time period.

Proceeding to block 94, arbitration element 14 creates algorithmic variations to solve the problem.

In block 96, arbitration element 14 sends the problem statement and an algorithmic variation to each of first and second problem elements 16 and 18, and starts timer 38.

In block 96, each of first and second problem elements 16 and 18 attempts to solve the problem in its prescribed manner. First problem element 16 attempts to solve the problem using the first algorithmic variation and returns a solution to arbitration element 14. Second problem element 18 attempts to solve the problem using the second algorithmic variation.

In block 98, arbitration CPU 28 waits for a predetermined combination of responses from first and second problem elements 16 and 18 and from timer 38.

In block 99, the method determines whether at least one solution has been returned within the allotted time. If neither problem element 16 or 18 completes a solution, timer 38 of arbitration element 14 allows arbitration element 14 to return an error response to application element 12 in block 100 and the method ends in block 109. If at least one of problem elements 16 or 18 has returned a solution, then the method proceeds to block 102.

In block 102, arbitration element 14 determines whether one or both of problem elements 16 and 18 returned a solution. If only one problem element solved the problem in the allotted time, then arbitration element 14 returns this solution to application element 12 in block 104 and the method proceeds to block 108. If the problem description asked for a return of the first solution found, then this would be returned to the application element by the arbitration element at that time, and the task running on the remaining problem element would be canceled.

In block 106, if both problem elements 16 and 18 solve the problem in the allotted time, then arbitration element 14 may return both solutions to application element 12, or return only one of the solutions, in accordance with a preference statement as specified by the problem statement.

In block 108, application element 12 receives and processes the solution and the method ends. Application element 12 may store the solution in application memory 22, display the solution on application display 26, or write the solution to other application I/O devices.

As an additional note, application element 12 may converse with arbitration element 14 about the progress of large jobs, and about the general status or efficiency of the arbitration element's internal tasks. For this purpose, each of the three internal tasks (initiator 34, terminator 36, and rules updater 40) has its own status reporting subtask (see FIGS. 7–9). Application element 12 may also need to perform updates of the rules used by task initiator 34, for example, when new tables are added to a database.

In block 109, the method ends.

Figure 7:
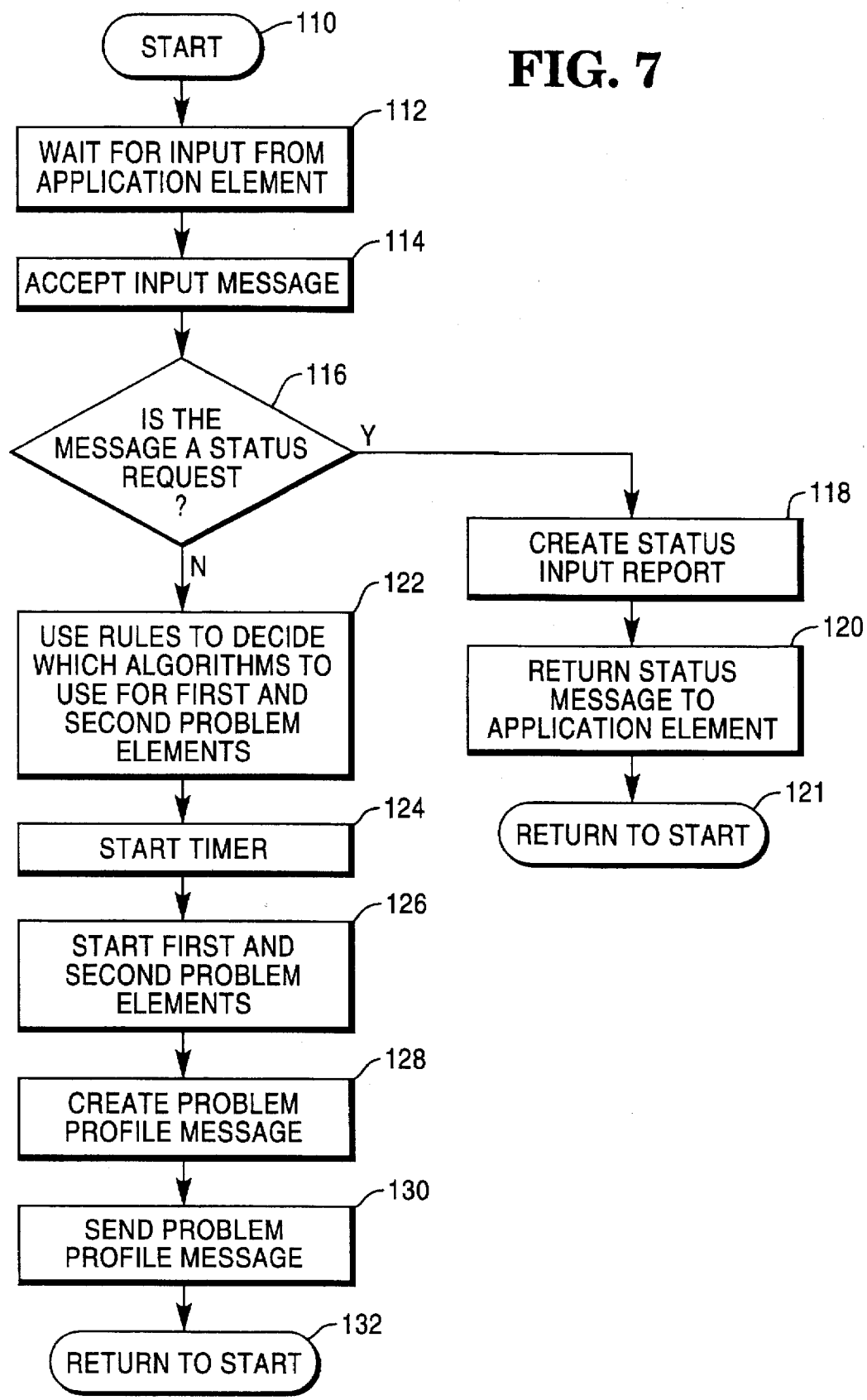
FIG. 7 is a flow diagram illustrating the operation of the Task Initiator of the system of the present invention.

Referring now to FIG. 7, the operation of task initiator 34 is shown in more detail, beginning with START 110. In block 112, task initiator 34 waits for an input from application element 12.

In block 114, task initiator 34 accepts an input message from application element 12. Problem statements received by arbitration element 14 from application element 12 are queued for processing by input handling task 60. (The actual queuing could be done by operating system software, as is typically done for multi-threaded tasks in today's systems.)

In block 116, task initiator 34 determines whether the message is a status request. Simple status reporting tasks are handled by status reporting task 62. Responses to status reports are returned directly to application element 12. If the message is a status request, task initiator 34 creates an input status report in block 118 and returns a status message to application element 12 in block 120. In block 121, the method proceeds back to START 110.

Returning to block 116, if the message is not a status request, then task initiator 34 uses rules retrieved from arbitration memory 30 or other I/O devices 32 to decide which algorithms to use for first and second problem elements 16 and 18 in block 122. Problem analysis task 64 decides how to deal with the problem generally—for example, which set of rules to apply in analyzing the problem. Problem analysis task 64 then does a detailed analysis in order to ascertain the algorithmic variations to be tried on first and second problem elements 16 and 18. For example, the rules might be declarations such as, "If the problem requires joining three tables in a database, then start first problem element 16 by joining the first two tables first, and start second problem element 18 by joining the last two tables first."

In block 124, task initiator 34 starts timer 38 through algorithm assignment task 66.

In block 126, algorithm assignment task 66 sends the different algorithmic variations with the problem statement to first and second problem elements 16 and 18 and starts first and second problem elements 16 and 18 coincident with the start of timer 38.

In block 128, task initiator 34 creates a problem profile message. This problem profile message identifies the problem, indicates that it has been started by first and second problem elements 16 and 18, and tells task terminator 36 how to decide when to return a response to application element 12. For example, a problem profile message might indicate to task terminator 36 that the first solution received from either problem element is sufficient.

In block 130, profile creation task 68 sends the problem profile message containing that information to task terminator 36 before returning to START 110 in block 132.

Figure 8A:
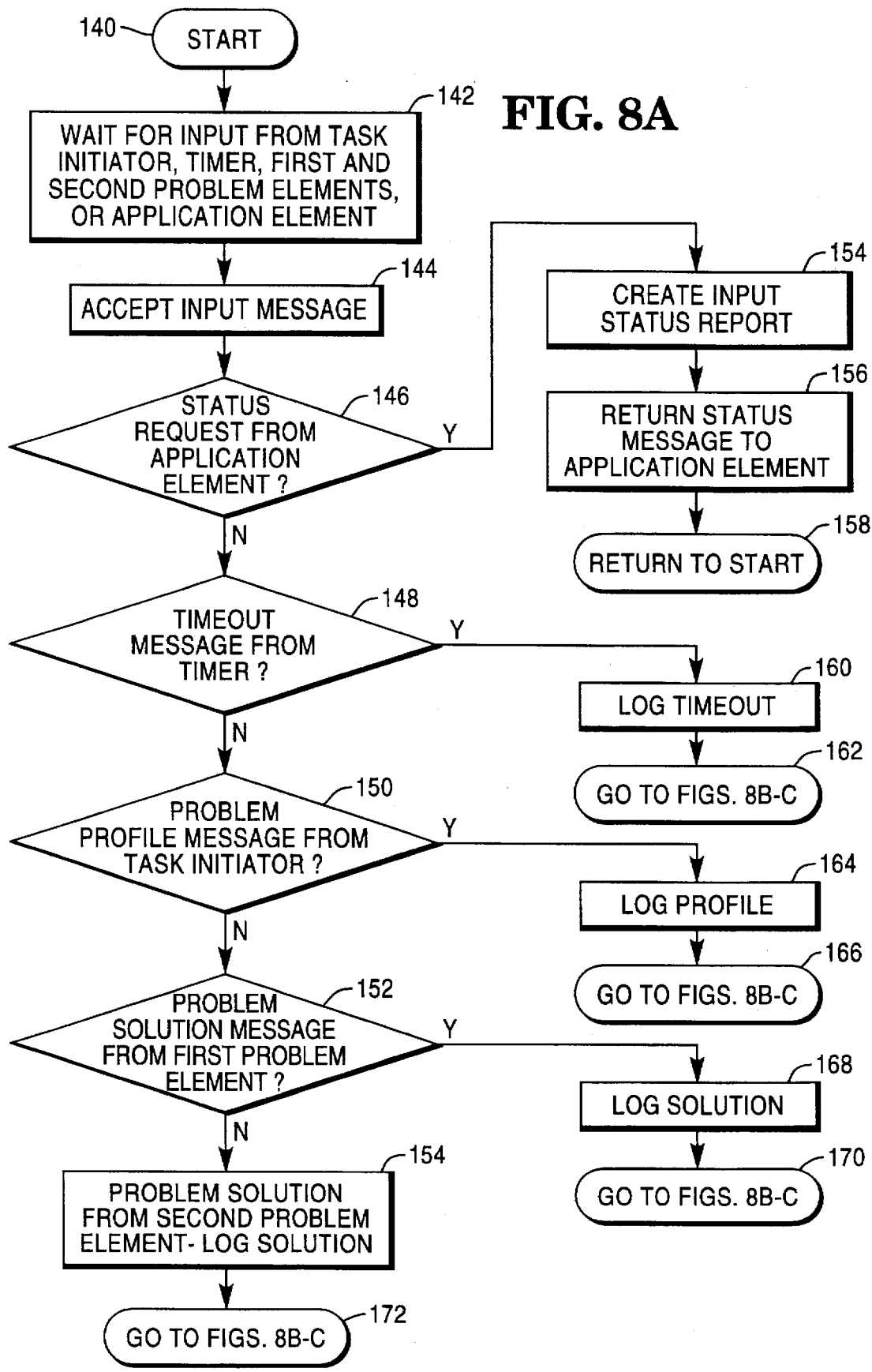
FIGS. 8A–C are flow diagrams illustrating the operation of the Task Terminator of the system of the present invention.
Figure 8B:
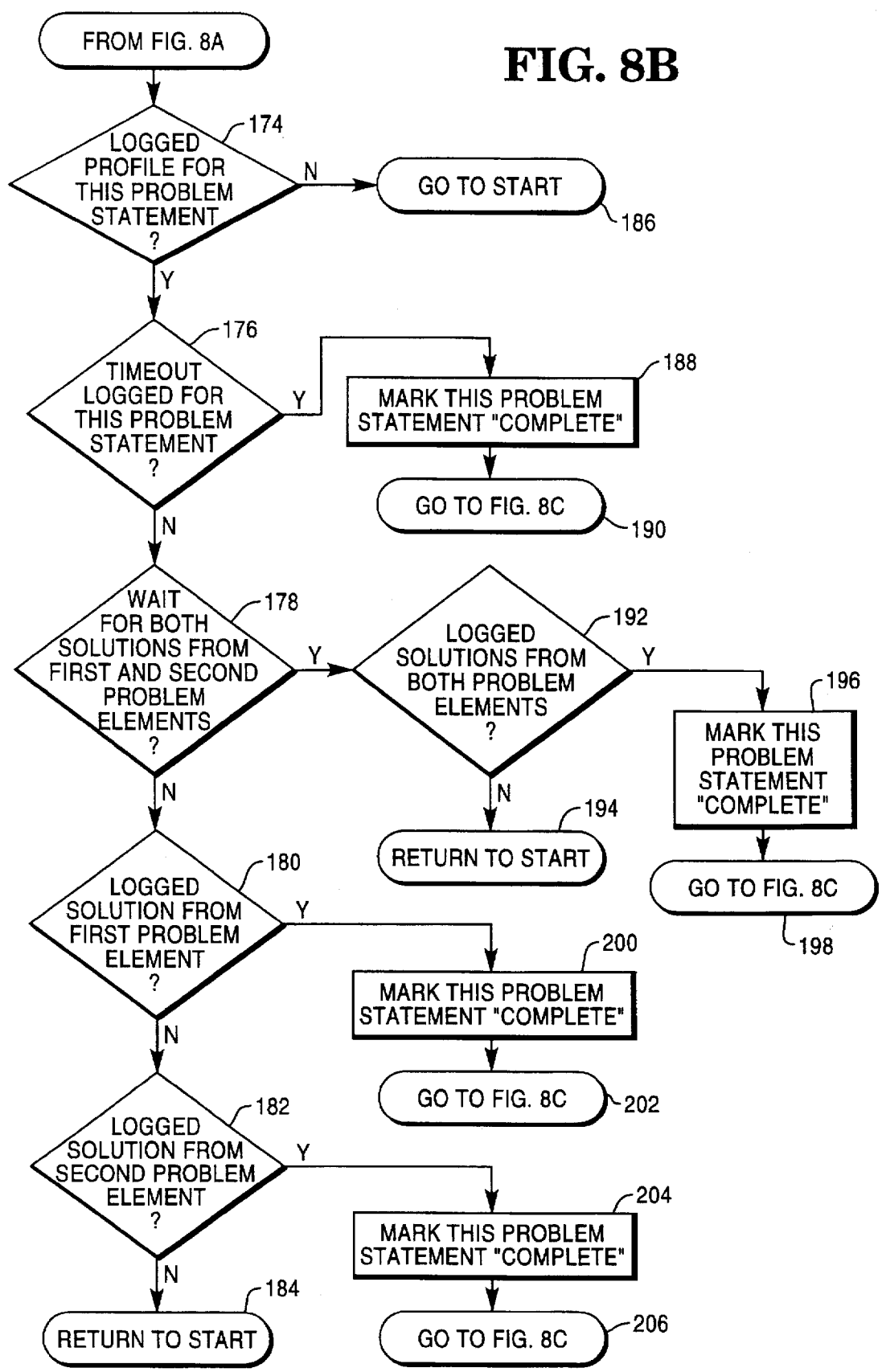
Figure 8C:
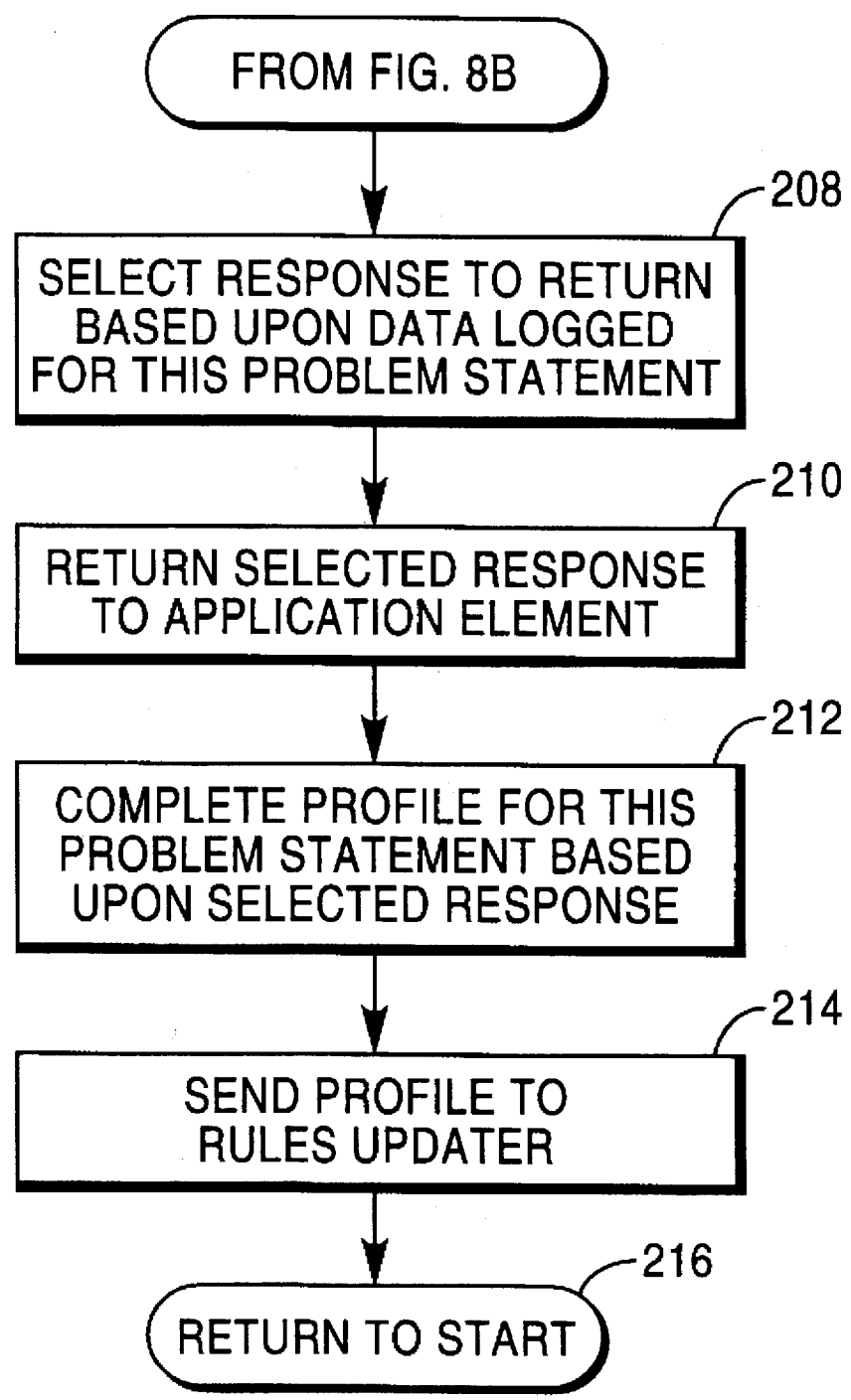

Referring now to FIGS. 8A–C, the operation of task terminator is shown in detail, beginning with START 140. In block 142, task terminator 36 waits for an input from task initiator 34, timer 38, first and second problem elements 16 and 18, or application element 12.

In block 144, task terminator 36 accepts an input message. The input message may be a problem profile statement from task initiator 34, a solution message from first and second problem elements 16 and 18, or a time-out (time expiration) message from timer 38. All of these messages are queued for processing by input handling task 70. Problem profile statements are stored in the shared memory and storage devices 41 for later control of problem termination or for status reporting.

Thus, in block 146–152, the method determines the type of input message. Messages from first and second problem elements 16 and 18 or from timer 38 are saved by completion deciding task 74 if they precede a time at which they can be processed (for example, if they precede the receipt of the matching problem profile statement) or if it is decided that problem completion should await a later event (as when competing solutions will be compared).

Thus, in block 146, if the message is a status request from application element 12, the method proceeds to block 154, in which task terminator 36 creates an input status report. In block 156, task terminator 36 returns a message to application element 12 before returning to START 140 in block 158.

In block 148, if the message is a time-out message from timer 38, the method logs the time-out in block 160 before proceeding to block 162 to implement the method of FIGS. 8B–C.

In block 150, if the message is a problem profile statement from task initiator 34, the method logs the profile in block 164 before proceeding to block 166 to implement the method of FIGS. 8B–C.

In block 152, if the message is a problem solution from first problem element 16, the method logs the solution in block 168 before proceeding to block 170 to implement the method of FIGS. 8B–C.

If the method reaches block 154, the message must be a solution from second problem element 18. In block 154, the method logs the solution before proceeding to block 172 to implement the method of FIGS. 8B–C.

With reference to FIG. 8B, task terminator 36 decides whether a profile has already been logged for the problem statement in block 174. If it decides that a profile has not been logged, the method returns to START 140 (FIG. 8A) in block 186.

If task terminator 36 decides that the profile has been logged, it determines whether a time-out has also been logged for the problem statement in block 176. If so, task terminator 36 marks the problem statement "complete" in block 188 and the method proceeds to FIG. 8C in block 190.

If a time-out has not been logged, task terminator 36 determines whether to wait for solutions from both first and second problem elements 16 and 18 in block 178. If so, task terminator 36 determines whether both solutions have been logged in block 192. If not, then the method returns to START 140 in block 194. If so, then task terminator 36 marks the problem statement "complete" in block 196 and the method proceeds to FIG. 8C in block 198.

Returning to block 178, if task terminator 36 decides not to wait for both solutions, it determines whether it has logged the solution from first problem element 16 in block 180. If so, task terminator 36 marks the problem statement "complete" in block 200 and the method proceeds to FIG. 8C in block 202.

If task terminator 36 decides that it has not logged the solution from first problem element 16, then it decides whether it has logged the solution from second problem element 18 in block 182. If so, task terminator 36 marks the problem statement "complete" in block 204 and the method proceeds to FIG. 8C in block 206.

If task terminator 36 decides that it has not logged the solution from second problem element 18, then the method returns to START 140 in block 184.

Referring now to FIG. 8C, task terminator 36 selects a response to return based upon data logged for the problem statement in block 208.

In block 210, task terminator 36 returns the selected response to application element 12. When problem completion has been logically determined according to either rules or information sent by application element 12 as a part of the problem statement, then completion deciding task 74 passes the pertinent problem information on to response compiling task 76. This task is responsible for notifying application element 12 of completion, along with providing an appropriate description of the favored solution that was provided. As with the other subtasks of task terminator 36, response completion task 76 also updates the status of this problem and of the system.

In block 212, task terminator 36 completes the profile for the problem statement based upon the selected response.

In block 214, task terminator 36 sends the profile to the rules updater 40. Profile completion task 78 updates statistics or descriptive data about how the problem was solved, and forwards the profile on to rules updater 40 with results for this problem.

In block 216, the method returns to START.

Turning now to FIG. 9, the operation of rules updater 40 is shown in more detail, beginning with START 220. In block 222, rules updater 40 waits for an input from application element 12 or task terminator 36.

In block 224, rules updater 40 accepts an input message. Input handling task 80 processes queued messages from application element 12 and from task terminator 36.

In block 226, rules updater 40 determines whether the message is a status request from application element 12. If so, rules updater 40 creates a rules status report in block 228. Status reporting requests are passed to status reporting task 82, which is designed to provide this service to application element 12. Status reporting task 82 uses shared memory and storage devices 41 to supply information about stored rules.

In block 230, rules updater 40 returns the status message to application element 12 before returning to START 220 in block 232.

Returning to block 226, if the message is not a status request, then rules updater 40 determines whether the message is a rules maintenance request from application element 12 in block 234. Rule maintenance task 84 could do "manual" maintenance at the request of the user (via application element 12), or "automatic" maintenance to change rules depending on the effectiveness of current rules, and based on information returned by task terminator 36.

In block 236, rules maintenance requests are passed to rule maintenance task 84, which uses shared memory and storage devices 41 to alter the rules as requested in the message.

In block 238, the method returns to START 220.

Returning to block 234, if the message is not a rules maintenance request, then rules updater 40 employs the problem profile statement from task terminator 36 to adjust the rules in block 240. Rules updater 40 may vary the rules if desired, based upon the outcome of the inputs received from arbitration I/O devices 32, and store its results in shared memory and storage devices 41. For example, the rule described above for database "joins" might be varied to say that, for a given set of tables, one problem element should try instead to join the first and last tables first.

In block 242, the method returns to START 220.

Armed with the foregoing detailed description of the sequence of operations carried out by the preferred embodiment of the present invention, those of ordinary skill in the art will readily be able to write their own suitable software to operate a parallel processing computer in accordance with the teachings herein. Accordingly, the details of such software need not be described here. The software may be written in any suitable language, such as a lower-level language like assembly language, or a higher-level language such as "C". Variations and modifications of the present invention can be effected within the spirit and scope of the following claims.

What is claimed is:

1. A method for utilizing the assets of a parallel processing computer to solve a predetermined problem comprising the steps of:
    formulating the problem by an application program;
    creating different, competing, and previously undefined procedures from a pre-existing rule for solving the problem;
    substantially simultaneously starting execution of the procedures;
    starting a timer at the start of execution;
    if more than one different solution was generated by the procedures after a predetermined time period, returning a best one of the solutions based upon the rule for solving the problem to the application program; and
    if a solution was not generated by any of the procedures after the predetermined time period, terminating execution of all procedures.

2. The method as recited in claim 1, further comprising the steps of:
    monitoring the execution of the competing procedures to obtain information about the effectiveness of the competing procedures based upon the timeliness of the solutions; and
    changing the competing procedures based on the information.

3. The method as recited in claim 1, further comprising the steps of:
    if a first solution was generated by any of the competing procedures after the predetermined time period, terminating execution of all remaining competing procedures; and
    returning the first solution to the application program.

4. A search method for a parallel processing computer comprising the steps of:
    formulating a search problem for searching for a collection of data within a database by a database management application program;
    creating different, competing, and previously undefined search procedures from a pre-existing rule for solving the search problem;
    substantially simultaneously starting execution of the search procedures;
    starting a timer at the start of execution;
    if more than one different solution was generated by the search procedures after a predetermined time period, returning a best one of the solutions based upon the rule for solving the problem to the application program; and
    if a solution was not generated by any of the search procedures after the predetermined time period, terminating execution of all search procedures.

5. The method as recited in claim 4, further comprising the steps of:
    monitoring the execution of the competing search procedures to obtain information about the effectiveness of the competing search procedures based upon the timeliness of the solutions; and
    changing the competing search procedures based on the information.

6. The method as recited in claim 4, further comprising the steps of:
    if a first solution was generated by any of the competing search procedures after the predetermined time period, terminating execution of all remaining competing search procedures; and
    returning the first solution to the application program.

7. The method as recited in claim 4, wherein the search is a database search.

8. The method as recited in claim 4, wherein the search is a constructive search.

9. A parallel processing computer system comprising:
    an application element including a first processing unit for executing an application program;
    a first problem element including a second processing unit for solving a problem created by the application program in a first way;
    a second problem element including a third processing unit for solving the problem created by the application program in a second way different from and competing with and simultaneously with the first way;
    a timer for timing a predetermined length of time from the initiation of problem solving; and
    an arbitration element including a fourth processing unit for arbitrating interaction between the first processing unit and the second and third processing units, and for creating the first and second ways of solving the problem after the problem is created by the application program, for initiating problem solving by the second and third processing units, for monitoring problem solving by the second and third processing units, and for selecting and returning a best solution out of first and second solutions to the application program based upon a pre-existing rule.

10. The parallel processing computer system as recited in claim 9, wherein the arbitration element also terminates problem solving by the second and third processing units based upon the pre-existing rule.

11. The parallel processing computer system as recited in claim 9, wherein the arbitration element also changes the first and second ways of solving the problem during execution of the first and second ways based upon the pre-existing rule.

12. The parallel processing computer system as recited in claim 9, wherein the problem created by the application program is a database search.

13. The parallel processing computer system as recited in claim 9, wherein the problem created by the application program is a constructive search.

14. A parallel processing computer system comprising:

an application element including an application processing unit for executing an application program;

a plurality of problem elements, each including a problem processing unit for solving a problem created by the application program in one of a plurality of different and competing ways;

a timer for timing a predetermined length of time from the initiation of problem solving; and an arbitration element including an arbitration processing unit for arbitrating interaction between each of the problem processing units, and for creating the plurality of different and competing ways of solving the problem after the problem is created by the application program, for initiating problem solving by the problem processing units, for monitoring the execution of the different and competing ways to obtain information about the effectiveness of the different and competing ways based upon the timeliness of the solutions, for changing the different and competing ways during execution of the different and competing ways based on the information, and for selecting and returning a best solution out of a plurality of different solutions to the application program based upon a pre-existing rule.

15. A method for utilizing the assets of a parallel processing computer to solve a predetermined problem external to the computer comprising the steps of:

formulating the external problem by an application program;

creating different, competing, and previously undefined procedures from a pre-existing rule for solving the external problem;

substantially simultaneously starting execution of the procedures;

starting a timer at the start of execution;

if more than one different solution was generated by the procedures after a predetermined time period, returning a best one of the solutions based upon the rule for solving the external problem to the application program; and if a solution was not generated by any of the procedures after the predetermined time period, terminating execution of all procedures.

\* \* \* \* \*